(12) United States Patent
Liu et al.

(10) Patent No.: US 11,003,461 B2
(45) Date of Patent: May 11, 2021

(54) BOOT PROCESS SECURITY SELF-CHECK SYSTEM

(71) Applicant: Dell Products L.P., Round Rock, TX (US)

(72) Inventors: Wei G. Liu, Austin, TX (US); Juan Francisco Diaz, Round Rock, TX (US); Jayanth Raghuram, Round Rock, TX (US); Murali Manohar Shanmugam, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 140 days.

(21) Appl. No.: 16/369,006

(22) Filed: Mar. 29, 2019

(65) Prior Publication Data

US 2020/0310826 A1 Oct. 1, 2020

(51) Int. Cl.
*G06F 9/00* (2006.01)
*G06F 9/4401* (2018.01)
*G06F 13/42* (2006.01)
*G06F 21/57* (2013.01)

(52) U.S. Cl.
CPC ........ *G06F 9/4411* (2013.01); *G06F 13/4282* (2013.01); *G06F 21/572* (2013.01); *G06F 9/4401* (2013.01)

(58) Field of Classification Search
CPC ... G06F 9/4411; G06F 13/4282; G06F 21/572
USPC .......................................................... 713/2
See application file for complete search history.

(56) References Cited

U.S. PATENT DOCUMENTS

| | | | | |
|---|---|---|---|---|
| 6,711,675 | B1* | 3/2004 | Spiegel ................. | G06F 9/4401 713/164 |
| 2010/0115202 | A1* | 5/2010 | Zimmer ................ | G06F 12/126 711/118 |
| 2011/0078408 | A1* | 3/2011 | Ishida ................... | G06F 21/572 711/216 |
| 2013/0013905 | A1* | 1/2013 | Held ..................... | G06F 21/575 713/2 |
| 2016/0085558 | A1* | 3/2016 | Anbazhagan ....... | G06F 12/1458 713/2 |
| 2017/0168844 | A1* | 6/2017 | Swanson ............. | G06F 13/4282 |
| 2019/0095219 | A1* | 3/2019 | Guo ..................... | G06F 9/30101 |
| 2019/0370011 | A1* | 12/2019 | Liu ....................... | G06F 9/4411 |

* cited by examiner

*Primary Examiner* — Volvick Derose
(74) *Attorney, Agent, or Firm* — Haynes and Boone, LLP (57) ABSTRACT

A boot process security system includes a processing system including a plurality of registers, and at least one memory system that includes instructions that, when executed by the processing system, cause the processing system to provide a BIOS. During a Driver eXecution Environment (DXE) sub-process that is included in a boot process and that occurs prior to passing control of the boot process to any third-party drivers, the BIOS programs at least one of the plurality of registers in order to configure at least one secure subsystem. The BIOS then verifies, during the boot process, that the at least one secure subsystem has been configured to provide a predetermined configuration, and locks the at least one secure subsystem. The BIOS then confirms that the at least one secure subsystem has been locked prior to passing control of the boot process to any third-party drivers.

20 Claims, 6 Drawing Sheets

BOOT PROCESS SECURITY SELF-CHECK SYSTEM

BACKGROUND

The present disclosure relates generally to information handling systems, and more particularly to a Basic Input Output System (BIOS) that is configured to ensure that boot operations are securely performed early in a boot process for the information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Security standards for information handling systems such as, for example, server devices, continue to become more and more stringent. For example, it is desirable to implement high security standards for the Serial Peripheral Interface (SPI) flash memory in the server device that is utilized to store BIOS code, System Management Mode (SMM) code, and/or other boot and runtime code known in the art, as without such security, the SPI flash memory, SMM runtime services, and/or other critical elements of the server device may be compromised. However, due to the large variety of different host processing systems (which may be provided by Central Processing Units (CPUs), chipsets, Platform Controller Hubs (PCHs), and/or other host processing system components known in the art), and their associated host processing system reference code that must be supported in order to provide the high security standards discussed above, the possibility arises that a boot process for the server device may provide for the misconfiguring or incorrect programming of security-related registers in the host processing system in a manner that can expose security holes or otherwise fail to meet the high security standards required by some server devices.

For example, the misconfiguration of an SPI flash memory descriptor in a register in the host processing system of server devices during its boot process can produce an associated security vulnerability in those server devices, and when such misconfigurations are provided as part of the boot process for server devices during the development of their associated server device platform, it requires a replacement of the BIOS in each server device that belongs to that server device platform in order to remedy that security vulnerability. Furthermore, the SPI flash memory descriptor provides a key component of the firmware write protection hardware features for the host processing system, and its misconfiguration further undermines the security of other secure subsystems in the server device in a manner that can allow, for example, arbitrary overwrites of the SPI flash memory that can operate to "brick", or otherwise render unusable, its associated server device. Conventional server devices sometimes include tools that are configured to perform basic checks on particular BIOS security features, but those tools operate subsequent to the completion of the boot process (e.g., in a Unified Extensible Firmware Interface (UEFI) shell, or within the operating system (as performed via CHIPSEC, Firmware Testing Suites (FWTSs), and/or other security testing subsystems known in the art)), which does not allow for the identification of security vulnerabilities that are exposed during the boot process (e.g., during the Power On Self Test (POST)), particularly those that may be exploited via the execution of option Read Only Memory (ROM), third party drivers, and/or other third party code Accordingly, it would be desirable to provide for improved boot process security.

SUMMARY

According to one embodiment, an Information Handling System (IHS) includes a Basic Input Output System (BIOS) processing system; and a BIOS memory system that is coupled to the BIOS processing system and that includes instructions that, when executed by the BIOS processing system, cause the BIOS processing system to: program, during a boot process, at least one register in order to configure at least one secure subsystem in the IHS; verify, during the boot process, that the at least one secure subsystem has been configured to provide a predetermined configuration; lock the at least one secure subsystem; and confirm that the at least one secure subsystem has been locked prior to passing control of the boot process to any third-party drivers.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
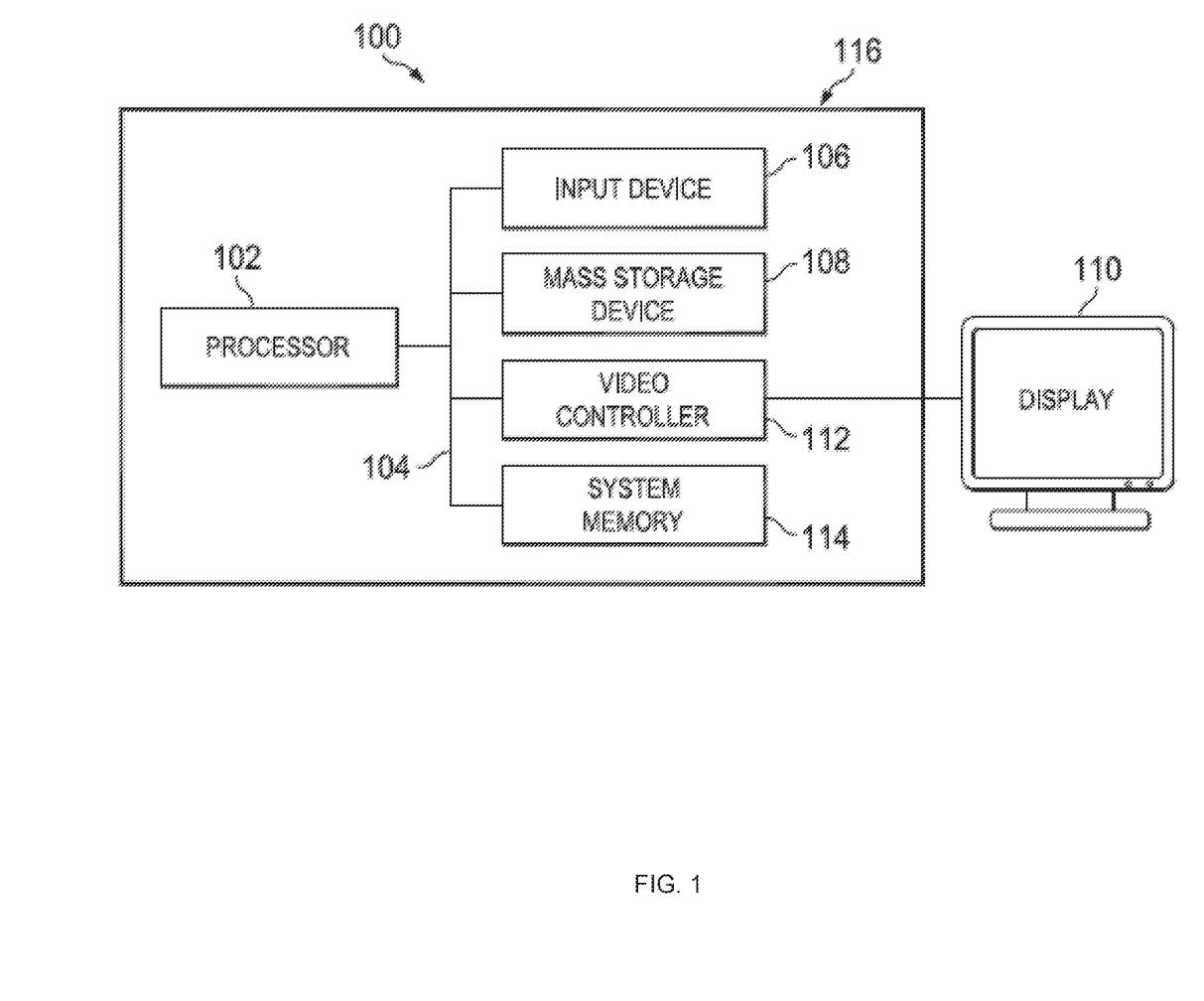
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
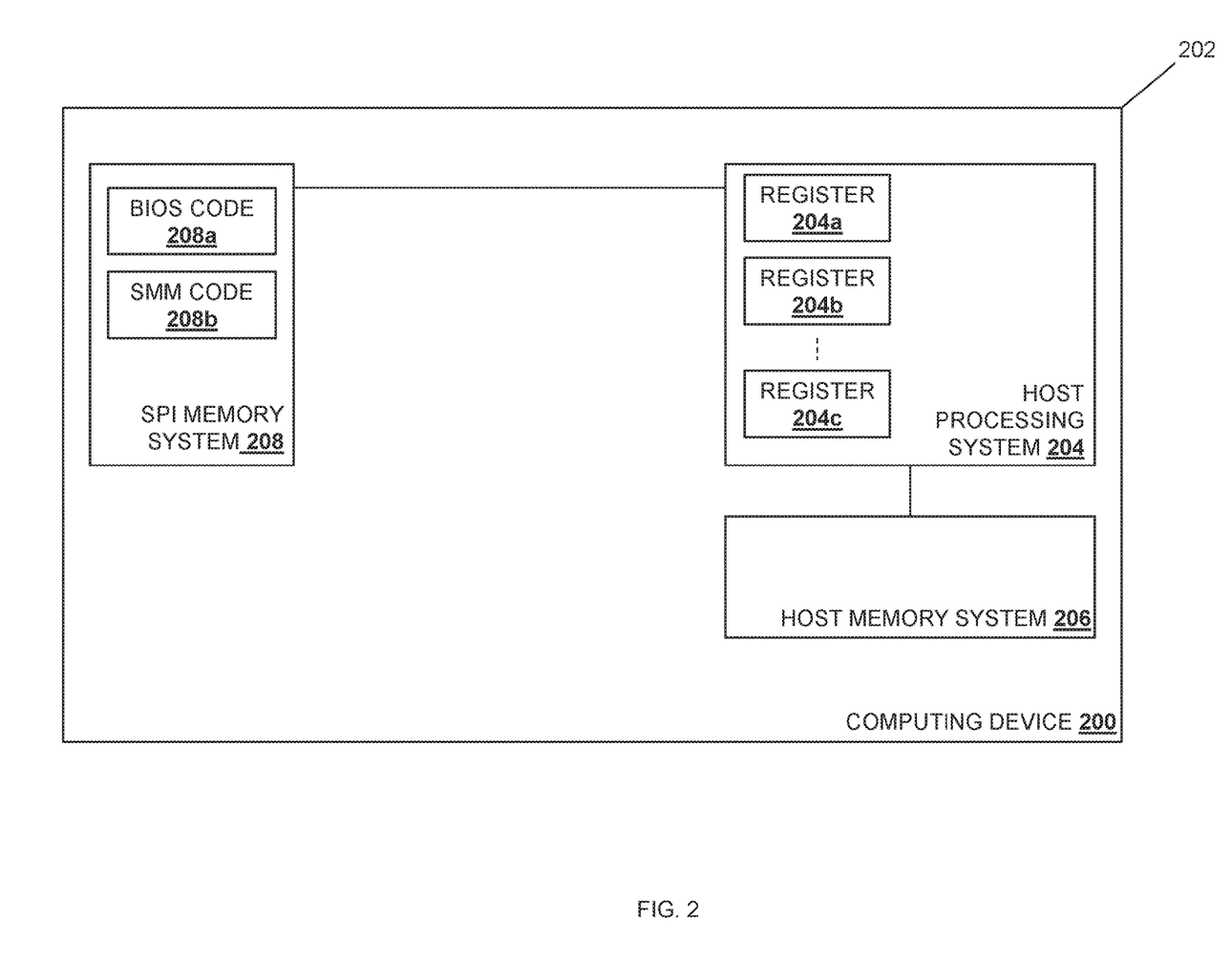
FIG. 2 is a schematic view illustrating an embodiment of a computing device that provides the boot process security system of the present disclosure.

Referring now to FIG. 2, an embodiment of a computing device 200 is illustrated that may provide the boot process security system of the present disclosure. The computing device 200 may be provided by the IHS 100 discussed above with reference to FIG. 1 and/or may include some or all of the components of the IHS 100. Furthermore, the computing device 200 is illustrated and discussed below as a server device, one of skill in the art in possession of the present disclosure will recognize that the functionality of the computing device 200 discussed below may be provided by networking devices, desktop computing devices, laptop computing devices, mobile phones, and/or other devices that are configured to operate similarly as discussed below. In the illustrated embodiment, the computing device 200 includes a chassis 202 that houses the components of the computing device 200, only some of which are illustrated below.

For example, the chassis 202 may house a processing system that, in the illustrated embodiment, is provided by a host processing system 204 (e.g., which may include the processor 102 discussed above with reference to FIG. 1). As would be understood by one of skill in the art in possession of the present disclosure, host processing systems may include a chipset, a Central Processing Unit (CPU) that may be included in the chipset, a chipset/CPU controller such as the Platform Controller Hub (PCH) available in chipsets provided by INTEL® corporation of Santa Clara, Calif., United States, and/or a variety of other host processing components known in the art. As would be understood by one of skill in the art in possession of the present disclosure, host processing systems that may provide the host processing system 204 will vary in configuration, with a wide variety of host processing systems available from particular host processing system manufacturers (e.g., "Greenlow" host processing systems, "Grantley" host processing systems, "Purley" host processing systems, "Mehlow" host processing systems, and "Whitley" host processing systems available from INTEL® Corporation of Santa Clara, Calif., United States) and across host processing system manufacturers (e.g., "Naples" host processing systems and "Rome" host processing systems available from ADVANCED MICRO DEVICES (AMD)® of Santa Clara, Calif., United States. In the illustrated embodiment, the host processing system 204 includes a plurality of registers 204a, 204b, and up to 204c, which as discussed below may be provided in the chipset and the chipset/CPU controller (i.e., as PCH registers), but one of skill in the art in possession of the present disclosure will recognize that the registers of the present disclosure may be provided by, or included with, a variety of host processing subsystems while remaining within the scope of the present disclosure as well. In the specific examples discussed below, the registers 204a-c may include System Management Mode (SMM) subsystem registers, Serial Peripheral Interface (SPI) subsystem registers, memory subsystem registers, and device-hide registers, but one of skill in the art in possession of the present disclosure will recognize that a variety of other registers may be utilized in the boot process security system of the present disclosure while remaining within its scope as well.

The chassis 202 may also house a memory system which, in the illustrated embodiment, includes a host memory system 206 that is coupled to the host processing system 204 and that may be provided by, for example, Dynamic Random Access Memory (DRAM) devices and/or other host memory devices known in the art. In addition, in the illustrated embodiment the memory system also includes an SPI memory system 208 that is coupled to host processing system 204 and that may be provided by, for example, an SPI flash memory device. However, one of skill in the art in possession of the present disclosure will recognize that the memory systems of the present disclosure may be provided by a variety of memory subsystems and/or devices while remaining within its scope as well. In the illustrated embodiment, the SRI memory system 208 stores Basic Input Output System (BIOS) code 208a that, as discussed below, may be executed by the host processing system 204 (while stored in the SRI memory system 208, and while stored in the host memory system 206 after copying of at least some of that BIOS code 208a to the host memory system 206) in order to provide BIOS functionality that one of skill in the art in possession of the present disclosure will recognize is enabled via non-volatile firmware that is configured to perform hardware initialization during a booting process for the computing device 200, as well as provide runtime services for an operating system and/or other programs provided on the computing device 200. As would be understood by one of skill in the art in possession of the present disclosure, the BIOS discussed below may be provided as a Unified Extensible Firmware Interface (UEFI) BIOS. Thus, while UEFI is known in the art as a specification that has been provided to replace the conventional BIOS, and that defines a software interface between an operating system and platform firmware provided on computing devices, one of skill in the art in possession of the present disclosure will recognize that the discussions of the BIOS below apply to a UEFI BIOS as well.

In the illustrated embodiment, the SRI memory system 208 also stores SMM code 208b that, as discussed below, may be executed by the host processing system 204 in order to provide SMM functionality that one of skill in the art in possession of the present disclosure will recognize provides an SMM operating mode for the host processing system 204 (e.g., for x86 CPUs) in which normal execution (including the operating system) is suspended and an alternate software subsystem (typically residing in firmware or a hardware-assisted debugger in the computing device 200) is executed with relatively high security privileges. However, while specific code is illustrated and described as being provided in the memory subsystem and utilized by the host processing system 204 below in order describe some specific examples of the functionality of the boot process security system of the present disclosure, one of skill in the art in possession of the present disclosure will recognize that other code may be provided in the memory system and be executed by the host processing system 204 while remaining within the scope of the present disclosure as well. While a specific computing device 200 has been illustrated, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
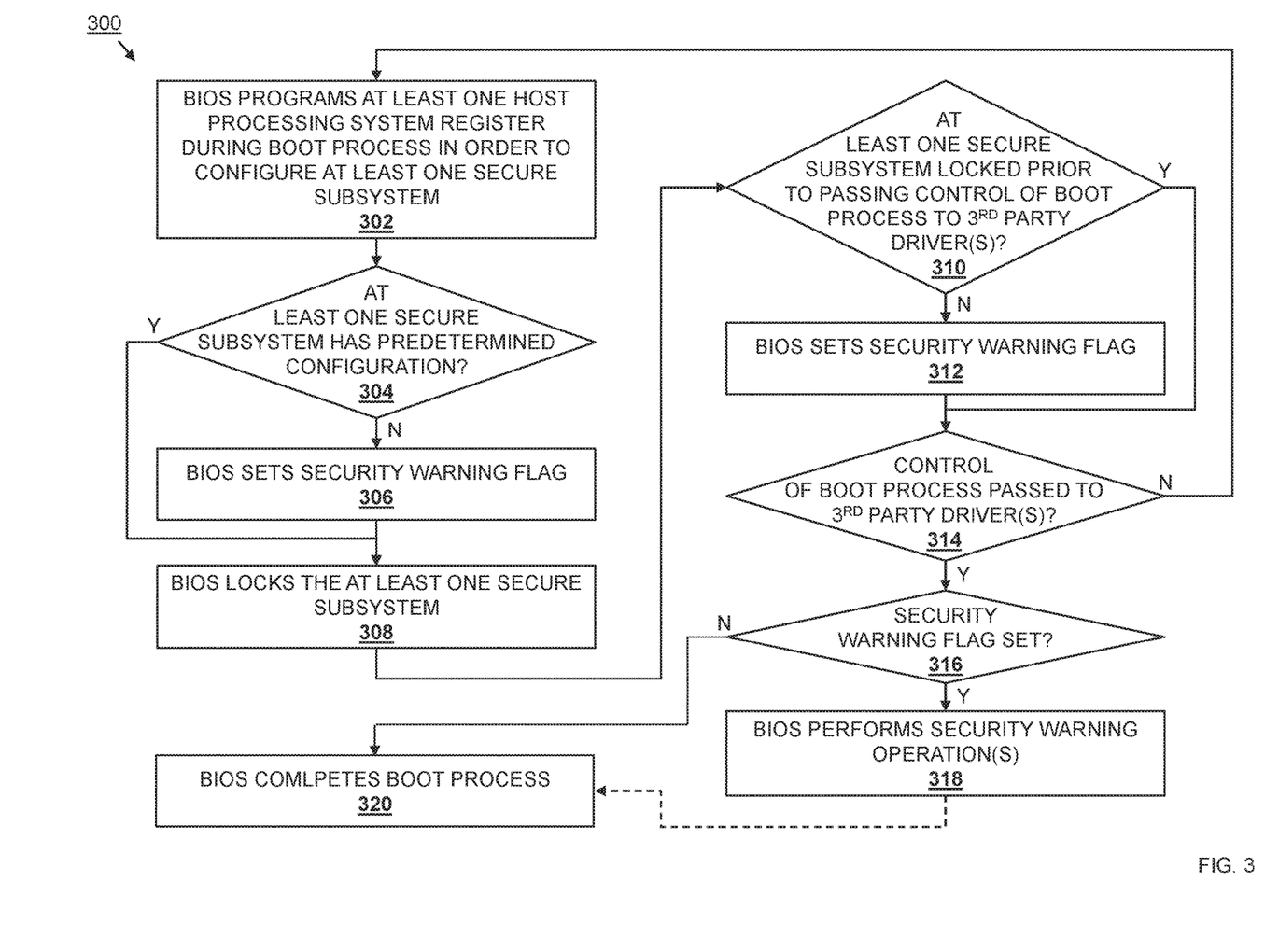
FIG. 3 is a flow chart illustrating an embodiment of a method for providing boot process security.

Referring now to FIG. 3, an embodiment of a method for providing security for a boot process is illustrated. As discussed below, the systems and methods of the present disclosure provide a BIOS that is configured to perform boot process security checks for secure subsystem(s) during the boot process (e.g., at particular Power On Self Test (POST) checkpoints such as Universal Extensible Firmware Interface (UEFI) events), log a security compliance status for those secure subsystems, and perform security warning operations in the event the security check identifies a failure to satisfy at least one secure subsystem security requirement. For example, in response to a "ready-to-lock" event associated with an SMM subsystem, the BIOS may verify that the SMM subsystem has been provided a predetermined configuration (e.g., via the programming of registers in a host processing system) and was locked prior to control of the boot process being passed to third party drivers such that those third party drivers (e.g., option ROMs and/or other third party code) are not able to subsequently install or modify SMM drivers. In another example, in response to an "end-of-DXE" event, the BIOS may verify that an SPI subsystem has been provided a predetermined configuration (e.g., via the programming of SPI protection range registers, SPI flash memory lock-down registers, BIOS lock-enable registers, and SMM_BWP registers in a host processing system) and was locked prior to control of the boot process being passed to third party drivers such that the SPI subsystem cannot be modified without proper authentication.

In some embodiments, the boot process security systems and methods of the present disclosure may be provided during the development of a computing device platform, and in the event any security issues are identified, the BIOS may log the error and display an error message (e.g., during a Bios Driver Selection (BDS) sub-process included in the boot process) so that the developers of the computing device platform are aware of the security vulnerability and may correct it in order to secure computing devices included in the computing device platform. However, in other embodiments, the boot process security systems and methods of the present disclosure may be provided in computing devices and utilized on each boot of those computing devices, and in the event any security issues are identified, the BIOS may log the error and display an error message, and/or halt operation of the computing device, depending on a severity of the security vulnerability. As such, security issues occurring early in the boot process and in a manner that introduce security vulnerabilities that can be exploited by third party drivers that are subsequently given control of the boot process, may be identified and addressed before those security vulnerabilities are exploited.

Figure 4A:
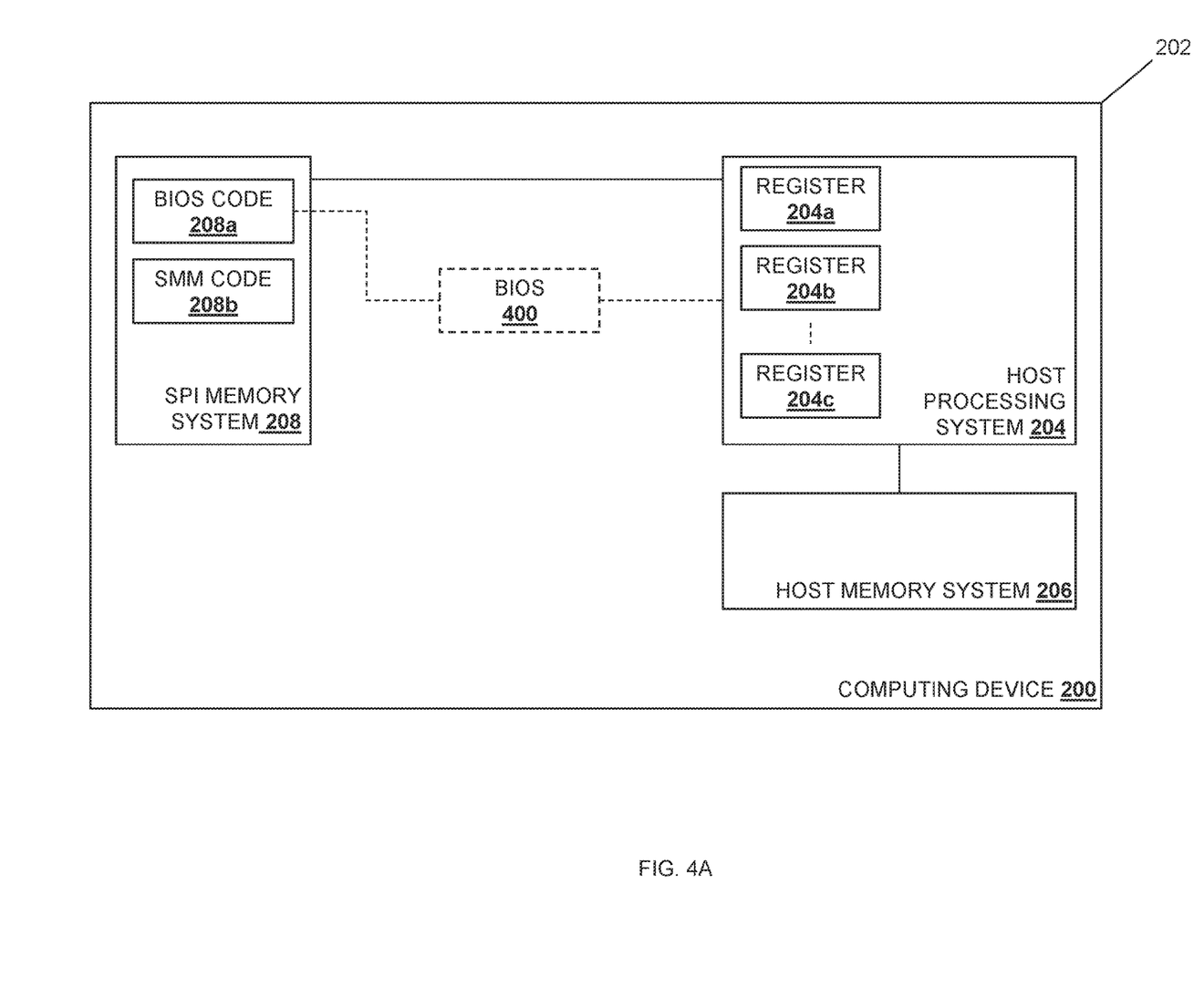
FIG. 4A is a schematic view illustrating an embodiment of the boot process security system provided in the computing device of FIG. 2 during the method of FIG. 3.
Figure 4B:
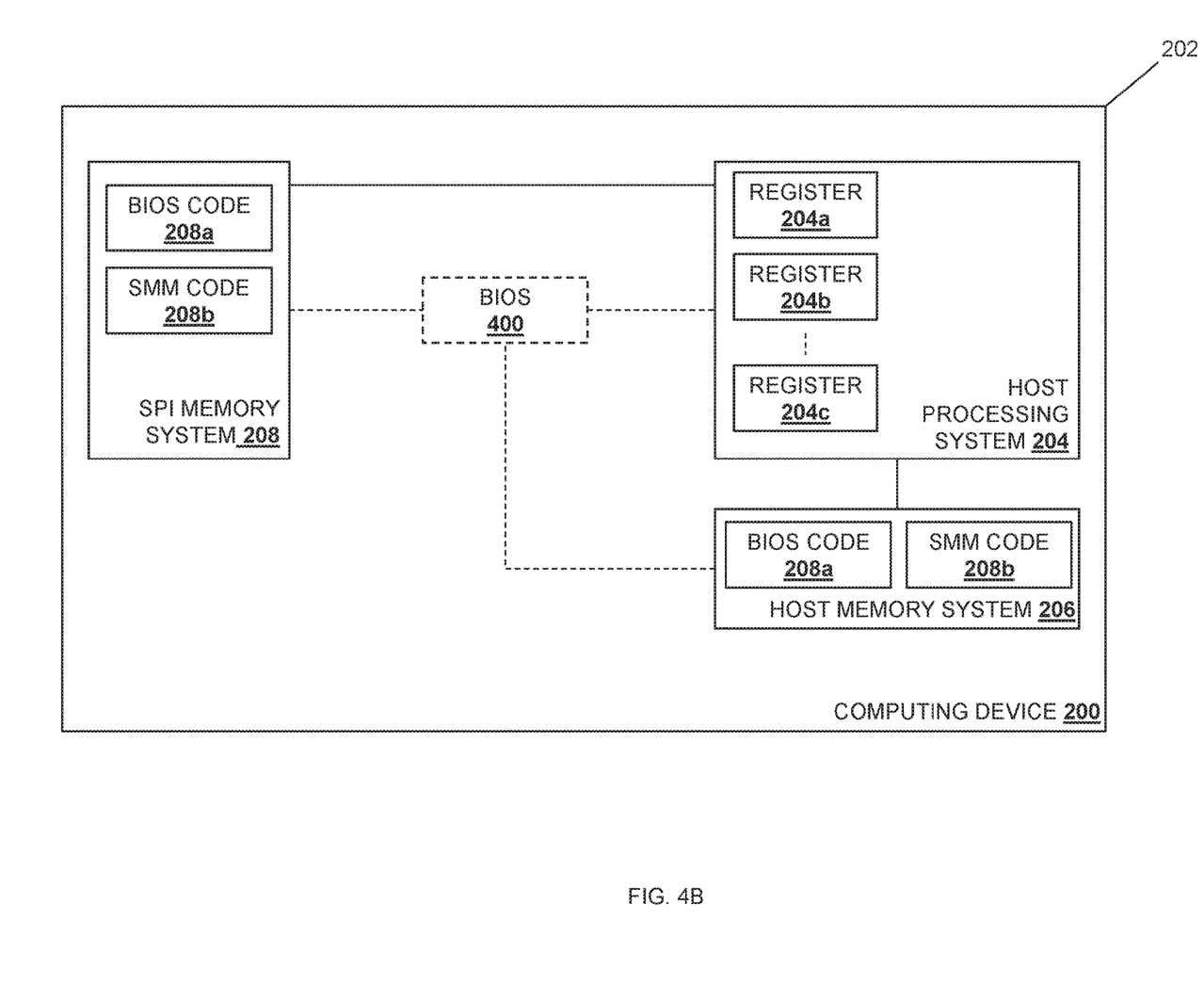
FIG. 4B is a schematic view illustrating an embodiment of the boot process security system provided in the computing device of FIG. 2 during the method of FIG. 3.

The method 300 begins at block 302 where a BIOS programs at least one host processing system register during a boot process in order to configure at least one secure subsystem. In an embodiment, at or prior to block 302, the computing device 200 may be started up, powered on, reset, re-booted, and/or otherwise initialized, which one of skill in the art in possession of the present disclosure will recognize will initiate a boot process for the computing device 200. As illustrated in FIG. 4A, the host processing system 204 (e.g., an x86 instruction set in the host processing system 204) may operate to execute some of the BIOS code 208a that is stored in the SPI memory system 208 in order to provide a BIOS 400 that, as discussed above, is configured to perform hardware initialization during the booting process for the computing device 200, as well as provide runtime services for an operating system and/or other programs provided on the computing device 200, and that may be provided as a Unified Extensible Firmware Interface (UEFI) BIOS. As illustrated in FIG. 4B, the BIOS 400 may then operate to copy at least some of the BIOS code 208a and the SMM code 208b to the host memory system 206 so that it may be executed by the host processing system 204 to continue to provide the BIOS 400 and/or provide an SMM for the host processing system 204.

In an embodiment, at block 302, the BIOS 400 may operate to program one or more of the registers 204a-c in the host processing system 204 (e.g., register(s) in the chipset, register(s) in the PCH, etc.) For example, with reference to FIG. 5, following (or as part of) the beginning of the boot process 500, a Driver eXecution Environment (DXE) sub-process 502 that is part of the boot process may begin. As would be understood by one of skill in the art in possession of the present disclosure, the DXE sub-process 502 provides a secure portion of the boot process in which only internal BIOS drivers, code, and/or other modules are utilized, rather than the third party driver(s)/code discussed below, with those internal BIOS drivers executed to provide for the programming of the host processing system 204 (e.g., the chipset and/or PCH) via the programming of one or more of the registers 204a-c. However, one of skill in the art in possession of the present disclosure will also recognize that portions of the host processing system 204 (e.g., the chipset and/or PCH) may be programmed subsequent to the DXE sub-process as well.

For example, the programming of the register(s) at block 302 to configure at least one subsystem may include the BIOS 400 programming SMM register(s) and/or SMM-related register(s) (e.g., System Management Interrupt (SMI) registers) in the host processing system 204 in order to configure the SMM subsystem that is provided when the host processing system 204 executes the SMM code 208b that is stored in the host memory system 206. In a specific example, the programming of SMM register(s) may include the programming of System Management Range Registers (SMRRs) that operate to protect regions of SMM memory, the programming of Memory-Type Range Registers (MTRRs) that operate to provide system software with control of how accesses to memory ranges by the CPU are cached, and/or the programming of any other SMM or SMM-related registers that would be apparent to one of skill in the art in possession of the present disclosure. As would be understood by one of skill in the art in possession of the present disclosure, the programming of SMI registers may enable a variety of SMI features known in the art.

In another example, the programming of the register(s) at block 302 to configure at least one subsystem may include the BIOS 400 programming SPI register(s) and/or SPI-related register(s) in the host processing system 204 in order to configure the SPI memory system 208. In a specific example, the programming of SPI register(s) may include the programming of SPI flash memory descriptors, the programming of SPI range protection registers, and/or the programming of any other SPI or SPI-related registers that would be apparent to one of skill in the art in possession of the present disclosure. However, while two specific examples have been provided, the programming of the register(s) by the BIOS 400 at block 302 may include the programming of memory configuration register(s) that operate to configure the host memory system 206, the programming of device-hide register(s) that operate to configure the hiding of device(s) in the computing device 200 from the operating system that is provided during runtime, and/or the programming of any other registers in the host processing system 204 in order to configure any other secure subsystem known in the art. Furthermore, while the specific example provided herein focuses on the programming of chipset and PCH registers such as the SMM registers, SMI registers, and SPI registers discussed above, one of skill in the art in possession of the present disclosure will recognize that the configuration of any other manipulatable element in the host processing system may be performed at block 302 while remaining within the scope of the present disclosure.

The method 300 then proceeds to decision block 304 where the BIOS determines whether the at least one secure subsystem has a predetermined configuration. In an embodiment, at decision block 304 and during the boot process, the BIOS 400 may operate to determine whether the at least one secure subsystem that was configured at block 302 was provided a predetermined configuration. For example, during the DXE sub-process discussed above and prior to any control of the boot process being passed to third party drivers, the BIOS 400 may compare the configuration of any of the secure subsystem(s) that were configured at block 302 to a predetermined configuration that was previously provided as part of the BIOS code 208a and/or is otherwise accessible to the BIOS 400. As such, the operation of the BIOS 400 at decision block 304 may be configured for a particular host processing system (e.g., particular chipset designs, CPU designs, PCH designs, etc.) in order to tailor the BIOS 400 for that host processing system in a manner that allows the BIOS 400 to verify that all registers in the host processing system have been programmed in a manner that has been determined to ensure the security of their associated secure subsystems.

As such, continuing with the specific examples provided above, at decision block 304 the BIOS 400 may determine whether the SMRRs that operate to protect regions of SMM memory have been configured in a predetermined configuration, whether the MTRRs that operate to provide system software with control of how accesses to memory ranges by the CPU are cached have been configured in a predetermined configuration, whether SMI features have been enabled as required by a predetermined configuration, whether SPI flash memory descriptors have been programmed as required by the predetermined configuration, whether SPI range protection registers have been configured in a predetermined configuration, whether memory configuration register(s) that operate to configure the host memory system 206 have been configured in a predetermined configuration, whether device-hide register(s) that operate to configure the hiding of device(s) in the computing device 200 from the operating system that is provided during runtime have been configured in a predetermined configuration.

If, at decision block 304, it is determined that the at least one secure subsystem does not have the predetermined configuration, the method 300 proceeds to block 306 where the BIOS sets a security warning flag. In an embodiment, at block 306 and in response to determining that at least one secure subsystem has not been configured according to the predetermined configuration, the BIOS 400 may set a security warning flag. For example, at decision block 304, the BIOS 400 may determine that the SMRRs that operate to protect regions of SMM memory have not been configured in the predetermined configuration, that the MTRRs that operate to provide system software with control of how accesses to memory ranges by the CPU are cached have not been configured in the predetermined configuration, that SMI features have not been enabled as required by the predetermined configuration, that SPI flash memory descriptors have not been programmed as required by the predetermined configuration, that SPI range protection registers have not been configured in the predetermined configuration, that memory configuration register(s) that operate to configure the host memory system 206 have not been configured in the predetermined configuration, and/or that device-hide register(s) that operate to configure the hiding of device(s) in the computing device 200 from the operating system that is provided during runtime have not been configured in the predetermined configuration and, in response, may set a security warning flag. While described as a flag, one of skill in the art in possession of the present disclosure will recognize that the BIOS 400 may note a security vulnerability (as a result of the determination at decision block 304 that a secure subsystem does not have a predetermined configuration) in any of a variety of manners that will fall within the scope of the present disclosure as well.

Figure 5:
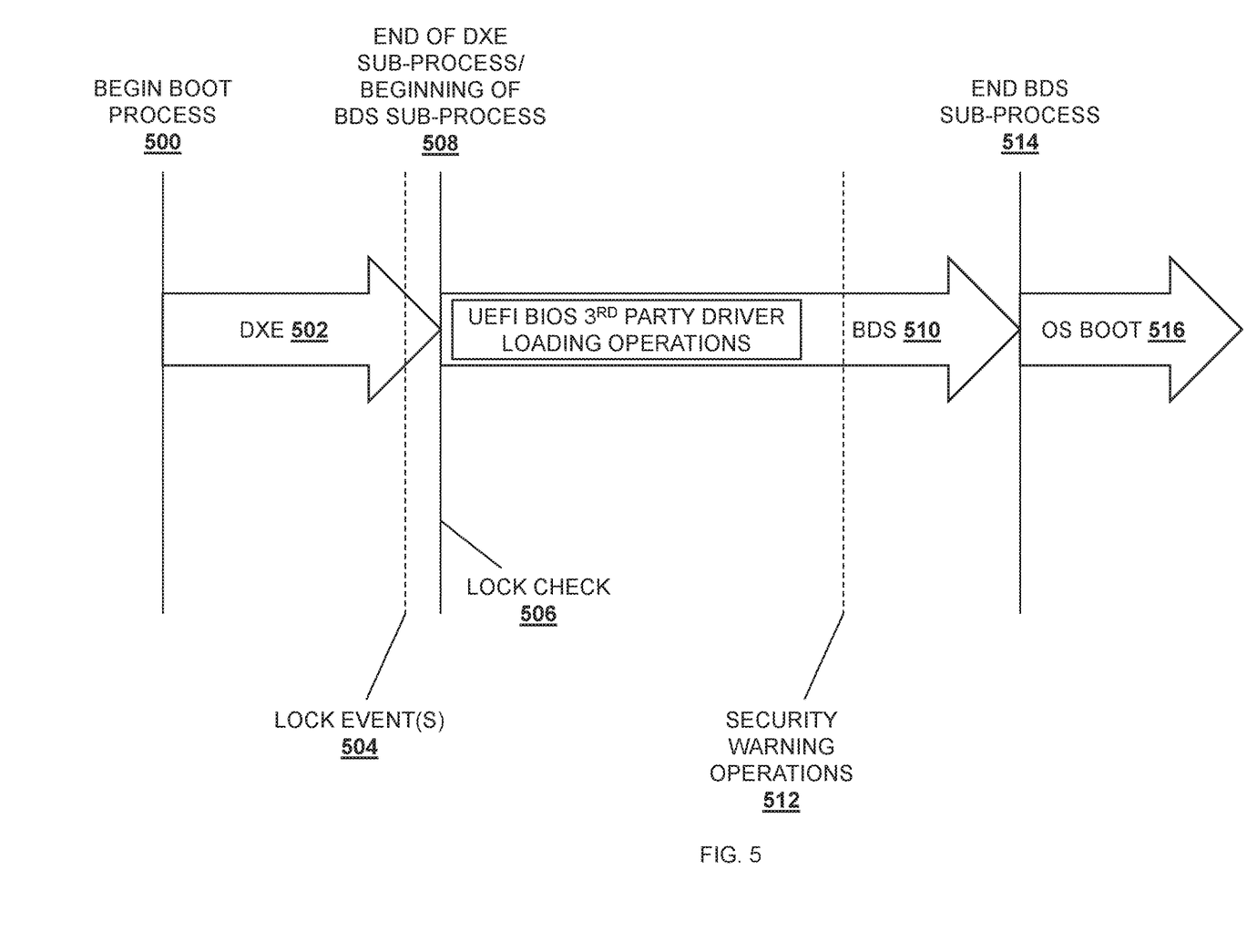
FIG. 5 is a flow chart illustrating an embodiment of operations performed by the boot process security system provided in the computing device of FIG. 2 during the method of FIG. 2.

If at decision block 304, it is determined that the at least one secure subsystem has the predetermined configuration, or following the setting of the security warning flag at block 306, the method 300 proceeds to block 308 where the BIOS locks the at least one secure subsystem. In an embodiment of block 308, the BIOS 400 may operate to lock the secure subsystem(s) that were configured at block 302. For example, at block 308, the BIOS 400 may operate to lock the SMM subsystem that was configured via the programming of the SMM and SMM-related registers in the host processing system 204 at block 302. With reference to FIG. 5, in a specific example, the locking of the SMM subsystem may include the BIOS 400 detecting a lock event 504 such as an SMM "ready-to-lock" event and, in response, operating to lock the SMM code 208b in a manner that prevents third party drivers such as option ROMs and/or other third party code, to install and/or modify SMM drivers. In a specific example, the locking of the SMM subsystem by the BIOS 400 may ensure that the SMM code 208b cannot be executed outside of a SMM for the host processing system 204. In another specific example, the locking of the SMM subsystem by the BIOS 400 may prevent SMI handlers from being installed, while also preventing any modification to existing SMI handlers.

In another example, at block 308, the BIOS 400 may operate to lock the SPI memory system 208 that was configured via the programming of the SPI and SPI-related registers in the host processing system 204 at block 302. With reference to FIG. 5, in a specific example, the locking of the SRI memory system 208 may include the BIOS 400 detecting a lock event 504 such as an "end-of-DXE" event and, in response, locking the SRI protection range registers, the flash lock-down registers, the BIOS lock-enable registers, and the SMM_BWP registers in the processing system 204 in a manner that ensures they cannot be modified without proper authentication. As such, the locking of the SRI memory system 208 by the BIOS 400 may include locking code portions of the SRI memory system 208 in order to prevent writing to those code portions of the SRI memory system 208 without a reset of the computing device 200. As would be understood by one of skill in the art in possession of the present disclosure, SRI protection range registers may be programmed to define data regions and code regions of the SRI memory system 208, and the locking of the SRI range registers prevents any modification of the SRI protection range registers that would subsequently enable writing to a code portion of the SRI memory system 208 (e.g., by defining it as a data portion of the SRI memory system 208 via that modification to the SRI protection range registers.) However, while two specific examples of the locking of secure subsystems has been described in response to lock events, one of skill in the art in possession of the present disclosure will recognize that other subsystem may be locked in a similar manner while remaining within the scope of the present disclosure as well.

The method 300 then proceeds to decision block 310 where the BIOS determines whether the at least one secure subsystem was locked prior to passing control of the boot process to third party driver(s). With reference to FIG. 5, in an embodiment of block decision 310, the BIOS 400 may operate to perform a lock check 506 that, in the illustrated embodiment, occurs at an end-of-DXE/beginning-of-BIOS Driver Selection (BDS) 508. As will be understood by one of skill in the art in possession of the present disclosure, upon completion of the DXE sub-process discussed above, the boot process may transition to a BDS sub-process in which UEFI BIOS third party driver loading operations are performed to load third party driver(s) or other third party code, and the BIOS 400 passes control of the boot process to those third party drivers/code. As such, FIG. 5 illustrates how it is desirable to have the lock check 506 performed prior to the loading of third party driver(s) and the passing of control of the boot process to those third party driver(s). However, while the lock check 506 is illustrated as being performed at the end of the DXE sub-process and the beginning of the BDS sub-process, one of skill in the art in possession of the present disclosure will recognize that the lock check 506 may be performed during the DXE sub-process and prior to the end of the DXE sub-process, or may be performed subsequent to the ending of the DXE sub-process and during the BDS sub-process, while still providing the security benefits of the present disclosure. Thus, following the locking of the secure subsystem at block 308, the BIOS 400 may operate to check the timing of the locking of that secure subsystem and, in particular, whether that secure subsystem was locked prior to passing control of the boot process to third party driver(s).

If, at decision block 310, it is determined that the at least one secure subsystem was not locked prior to passing control of the boot process to third party driver(s), the method 300 proceeds to block 312 where the BIOS sets a security warning flag. In an embodiment, at block 312 and in response to determining that at least one secure subsystem was not locked prior to passing control of the boot process to third party driver(s), the BIOS 400 may set a security warning flag. For example, at decision block 310, the BIOS 400 may determine that the SMM subsystem and/or the SPI subsystem was locked at some time after control of the boot process was passed to third party driver(s) and, in response, may set a security warning flag. While described as a flag, one of skill in the art in possession of the present disclosure will recognize that the BIOS 400 may note a security vulnerability (as a result of the determination at decision block 310 that a secure subsystem was not locked prior to passing control of the boot process to third party drivers) in any of a variety of manners that will fall within the scope of the present disclosure as well.

If at decision block 310, it is determined that the at least one secure subsystem was locked prior to passing control of the boot process to third party driver(s), or following the setting of the security warning flag at block 312, the method 300 proceeds to decision block 314 where the BIOS determines whether control of the boot process has been passed to third party driver(s) or other third party code. In an embodiment, at decision block 314 and in response to determining that at least one secure subsystem was locked prior to passing control of the boot process to third party driver(s), the BIOS 400 may then determined whether control of the boot process has been passed to third party driver(s). For example, with reference to FIG. 5, at decision block 314 the BIOS 400 may determine whether the BDS sub-process 510 is being performed, and the UEFI BIOS third party driver loading operations have been performed as part of that BDS sub-process 510 in order to load third party driver(s) and pass control of the boot process to those third party driver(s).

If, at decision block 314, it is determined that control of the boot process has not been passed to third party driver(s), the method 300 returns to block 302. As such, the method 300 may loop through blocks 302-314 in order to program host processing system registers to configure secure subsystem(s), verify those configurations, lock those secure subsystems, and verify that those secure subsystem(s) were locked prior to passing control of the boot process to third party driver(s), and continue that loop as long as control of the boot process has not been passed to third party driver(s). If at decision block 314, it is determined that control of the boot process has been passed to third party driver(s), the method 300 proceeds to decision block 316 where the BIOS determines whether a security warning flag is set. In an embodiment, at decision block 316, the BIOS 400 may operate to determine whether the security warning flag was set (e.g., at block 306 in response to a secure subsystem not having the predetermined configuration, at block 312 in response to a secure subsystem being locked after control of the boot process was passed to third party drivers, etc.) As discussed above, rather than checking for a flag, at block 316 the BIOS 400 may determine whether a security vulnerability was noted in any of a variety of manners that will fall within the scope of the present disclosure as well.

If, at decision block 316, it is determined that the security warning flag is set, the method 300 proceeds to block 308 where the BIOS performs a security warning operation. With reference to FIG. 5, in an embodiment of block 318, the BIOS 400 may perform security warning operations 512 during the BDS sub-process 510 and in response to any of the secure subsystems in the computing device 200 not being provided a predetermined configuration, or in response to any of the secure subsystems not being locked prior to passing control of the boot process to a third party driver. For example, the security warning operations may include generating and displaying a security warning to a user (e.g., via a display device coupled to the computing device) and, in some situations, halting operation of the computing device 200. As such, in developmental scenarios where the computing device 200 is being developed as part of a computing device platform, the security warning may be generated and displayed so that developers of the computing device platform may correct the security issue (e.g., modify the computing device 200 so that the secure subsystems are configured according to the predetermined configuration, and/or so that the secure subsystems are locked prior to passing control of the boot process to third party drivers). Furthermore, in scenarios where the boot process security system operates upon each boot of the computing device 200, the security warning may be generated and displayed so that a user of the computing device 200 may have the security issue corrected, and/or the operation of the computing device 200 may be halted so that the security vulnerability cannot be exploited.

If at decision block 316, it is determined that the security warning flag is not set, or following block 318 in optional embodiments (as illustrated by the dashed line in FIG. 3), the method 300 proceeds to block 320 where the BIOS completes the boot process. With reference to FIG. 5, in an embodiment of block 320, the BDS sub-process may end 514 and the BIOS 400 may operate to complete the boot process by completing an OS boot 516. As such, in the event that the secure subsystem(s) in the computing device 200 have been configured according to the predetermined configuration and have been locked prior to passing the control of the boot process to third party drivers, or in situations where the computing device 200 is allowed to complete the boot process subsequent to the secure subsystem(s) in the computing device 200 having not been configured according to the predetermined configuration and/or having been locked subsequent to passing the control of the boot process to third party drivers, the BIOS 400 operates to complete the boot process in a conventional manner that would be apparent to one of skill in the art in possession of the present disclosure.

Thus, systems and methods have been described that provide a BIOS that is configured to perform boot process security checks for secure subsystem(s) during the boot process, log a security status for those secure subsystems, and perform security warning operations in the event the security status fails to satisfy at least one security requirement. For example, in response to a lock event associated with an SMM subsystem, the BIOS may verify that the SMM subsystem has been provided a predetermined configuration (e.g., via the programming of registers in a host processing system) and has been locked prior to control of the boot process being passed to third party drivers such that those third party drivers (e.g., option ROMs and/or other third party code) are not able to subsequently install or modify SMM drivers. In another example, in response to an "end-of-DXE" event, the BIOS may verify that an SPI subsystem has been provided a predetermined configuration (e.g., via the programming of SPI protection range registers, SPI flash memory lock-down registers, BIOS lock-enable registers, and SMM_BWP registers in a host processing system) and has been locked prior to control of the boot process being passed to third party drivers such that the SPI subsystem cannot be modified without proper authentication. As such, a more secure boot process is enabled that prevents security vulnerabilities that can arise due to improper configurations of secure subsystems or access to those secure subsystem by third party drivers during a boot process.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A boot process security system, comprising:
a processing system including a plurality of registers; and
at least one memory system that is coupled to the processing system, wherein the at least one memory system includes instructions that, when executed by the processing system, cause the processing system to provide a Basic Input Output System (BIOS) that is configured to:
program, during a Driver eXecution Environment (DXE) sub-process that is included in a boot process and that occurs prior to passing control of the boot process to any third-party drivers, at least one of the plurality of registers in order to configure at least one secure subsystem, wherein the at least one secure subsystem includes at least one of a System Management Mode (SMM) subsystem or a Serial Peripheral Interface (SPI) subsystem, or the at least one of the plurality of registers includes at least one of an SMM register that is programmed to enable at least one SMM feature, an SPI register that is programmed with an SPI descriptor, an System Management Interrupt (SMI) register that is programmed to enable at least one SMI feature, a memory configuration register, or a device-hide register;
verify, during the DXE sub-process, that the at least one secure subsystem has been configured to provide a predetermined configuration;
lock, during or after the DXE sub-process and prior to a BIOS Driver Selection (BDS) sub-process that is included in the boot process, the at least one secure subsystem; and
confirm that the at least one secure subsystem has been locked prior to the BDS sub-process passing control of the boot process to any third-party drivers.

2. The system of claim 1, wherein the locking of the SMM subsystem prevents any SMI handlers from being installed or modified subsequent to passing control of the boot process to any third-party drivers.

3. The system of claim 1, wherein the locking of the SPI subsystem prevents writing to data code regions of the SPI subsystem subsequent to passing control of the boot process to any third-party drivers and prior to a reboot operation.

4. The system of claim 1, wherein processing system includes a chipset including a subset of the plurality of registers.

5. The system of claim 1, wherein processing system includes a Platform Controller Hub (PCH) including a subset of the plurality of registers.

6. The system of claim 1, wherein BIOS is configured to:
determine at least one of:
the at least one secure subsystem has not been configured to provide a predetermined configuration; and
the at least one secure subsystem has been locked prior to passing control of the boot process to any third-party drivers; and
generate and display, in response to the determining, a security warning message.

7. An Information Handling System (IHS), comprising:
a Basic Input Output System (BIOS) processing system; and
a BIOS memory system that is coupled to the BIOS processing system and that includes instructions that, when executed by the BIOS processing system, cause the BIOS processing system to:
program, during a Driver eXecution Environment (DXE) sub-process that is included in a boot process, at least one register in order to configure at least one secure subsystem in the IHS, wherein the at least one secure subsystem includes at least one of a System Management Mode (SMM) subsystem, or a Serial Peripheral Interface (SPI) subsystem or the at least one register includes at least one of an SMM register that is programmed to enable at least one SMM feature, an SPI register that is programmed with an SPI descriptor, an System Management Interrupt (SMI) register that is programmed to enable at least one SMI feature, a memory configuration register, or a device-hide register;
verify, during the DXE subprocess, that the at least one secure subsystem has been configured to provide a predetermined configuration;
lock, during or after the DXE sub-process and prior to a BIOS Driver Selection (BDS) sub-process that is included in the boot process, the at least one secure subsystem; and
confirm that the at least one secure subsystem has been locked prior to the BDS sub-process passing control of the boot process to any third-party drivers.

8. The IHS of claim 7, wherein the locking of the SMM subsystem prevents any SMM code from being modified subsequent to passing control of the boot process to any third-party drivers.

9. The IHS of claim 7, wherein the locking of the SPI subsystem prevents writing to the SPI subsystem subsequent to passing control of the boot process to any third-party drivers and prior to a reboot operation.

10. The IHS of claim 9, wherein the locking of the SPI subsystem prevents modification of SPI range registers that are provided by the at least one register and that define code regions and data regions in the SPI subsystem.

11. The IHS of claim 7, wherein at least one register is included in a chipset.

12. The IHS of claim 7, wherein at least one register is included in a Platform Controller Hub (PCH).

13. The IHS of claim 7, wherein the instructions, when executed by the BIOS processing system, cause the BIOS processing system to:
determine that the at least one secure subsystem has not been configured to provide a predetermined configuration, or that the at least one secure subsystem has been locked prior to passing control of the boot process to any third-party drivers and, in response, generate and display a security warning message.

14. A method for providing boot process security, comprising:
programming, by a BIOS during a Driver eXecution Environment (DXE) sub-process that is included in a boot process of a computing device, at least one register in order to configure at least one secure subsystem in the computing device, wherein the at least one secure subsystem includes at least one of a System Management Mode (SMM) subsystem or a Serial Peripheral Interface (SPI) subsystem, or the at least one register includes at least one of an SMM register that is programmed to enable at least one SMM feature, an SPI register that is programmed with an SPI descriptor, an System Management Interrupt (SMI) register that is programmed to enable at least one SMI feature, a memory configuration register, or a device-hide register;
verifying, by the BIOS during the DXE subprocess, that the at least one secure subsystem has been configured to provide a predetermined configuration;
locking, by the BIOS during or after the DXE sub-process and prior to a BIOS Driver Selection (BDS) sub-process that is included in the boot process, the at least one secure subsystem; and
confirming, by the BIOS, that the at least one secure subsystem has been locked prior to the BIOS Driver Selection (BDS) sub-process passing control of the boot process to any third-party drivers.

15. The method of claim 14, wherein the locking of the SMM subsystem prevents any SMM code from being modified subsequent to passing control of the boot process to any third-party drivers.

16. The method of claim 14, wherein the locking of the SPI subsystem prevents writing to the SPI subsystem subsequent to passing control of the boot process to any third-party drivers and prior to a reboot operation.

17. The method of claim 16, wherein the locking of the SPI subsystem prevents modification of SPI range registers that are provided by the at least one register and that define code regions and data regions in the SPI subsystem.

18. The method of claim 14, wherein at least one register is included in a chipset.

19. The method of claim 14, wherein at least one register is included in a Platform Controller Hub (PCH).

20. The method of claim 14, further comprising:
determining, by the BIOS, that the at least one secure subsystem has not been configured to provide a predetermined configuration, or that the at least one secure subsystem has been locked prior to passing control of the boot process to any third-party drivers and, in response, generate and display a security warning message.

* * * * *